United States Patent [19]

Cameron et al.

[11] Patent Number: 5,271,348
[45] Date of Patent: Dec. 21, 1993

[54] DRIVE ARRANGEMENT

[75] Inventors: Ewen R. Cameron, Oadby; Andrew Smith, Littlethorpe, both of England

[73] Assignee: British United Shoe Machinery Ltd., Leicester, England

[21] Appl. No.: 994,598

[22] Filed: Dec. 21, 1992

Related U.S. Application Data

[63] Continuation of Ser. No. 560,370, Jul. 30, 1990, abandoned.

[30] Foreign Application Priority Data

Aug. 12, 1989 [GB] United Kingdom ............... 8918441
Jul. 12, 1990 [GB] United Kingdom ............... 9015311

[51] Int. Cl.$^5$ ..................... H02P 5/40; D05B 69/22
[52] U.S. Cl. .................. 112/275; 388/831; 318/803
[58] Field of Search ...................... 112/28–38, 112/275, 277, 220; 318/800, 803, 805, 799; 388/831

[56] References Cited

U.S. PATENT DOCUMENTS

| | | | |
|---|---|---|---|
| 3,319,591 | 5/1967 | Hamlett | 388/831 |
| 4,499,414 | 2/1985 | Fujioka et al. | 318/803 |
| 4,627,370 | 12/1986 | Nakamura | 112/275 |
| 4,714,039 | 12/1987 | Shimada | 112/275 |
| 4,791,344 | 12/1988 | Yoshida et al. | 112/275 |
| 4,858,541 | 8/1989 | Ozawa | 112/275 |

FOREIGN PATENT DOCUMENTS

0110591 6/1984 European Pat. Off. .
2141968 5/1984 United Kingdom .

*Primary Examiner*—William M. Shoop, Jr.
*Assistant Examiner*—John W. Cabeca

[57] ABSTRACT

A drive arrangement comprises an a.c. induction motor (M1) having a rotary output shaft, and a drive control (FIG. 2), by which the speed of rotation of the shaft is controlled. The drive control comprises a signalling arrangement (e.g. a transducer (T) supplying an analogue signal converted by an analogue-to-digital converter (ADC) or a direct digital signalling arrangement) for supplying a digital signal having a value corresponding to the desired speed of rotation of the motor shaft, together with a processor (CPU) which receives the digital signal and at least one other input and processes the digital signal in accordance therewith. The processor supplies a corresponding, but modified, digital output signal to a digital-to-analogue converter (DAC) which converts the digital output signal to an analogue control signal and supplies it to an inverter which, in response thereto, drives the a.c. induction motor. An encoder (E) is operatively connected to the output shaft of the motor and supplies monitoring signals to the processor which processes them to provide a comparison value (representing actual rotation speed of the shaft) for comparison with a value corresponding to the signal from the signalling arrangement (representing the desired rotation speed). In the event of a discrepency between the two values, the digital output signal to the DAC is modified accordingly. A further input is provided by setting means (SS7) for setting a maximum speed of rotation of the shaft as a proportion of the "basic speed" of the motor, said setting means also supplying a signal to the processor (CPU) whereby the output digital signal is modified by a corresponding reduction factor.

21 Claims, 4 Drawing Sheets

DRIVE ARRANGEMENT

This is a continuation of copending application(s) Ser. No. 07/560,370 filed Jul. 30, 1990 now abandoned.

BACKGROUND OF THE INVENTION

This invention is concerned with a drive arrangement and more especially, but not exclusively, a drive arrangement for use in a folding machine of a type used in the shoe machinery and allied trades, i.e. a machine for folding the edge of a workpiece over upon itself. More particularly, the drive arrangement with which the present invention is concerned is of the type. comprising an a.c. induction motor having a rotary output shaft, and a drive control by which the speed of rotation of the shaft is controlled. and which comprises a signalling arrangement for supplying a signal having a value corresponding to the desired speed of rotation of the motor output shaft, the arrangement including a controller for supplying a signal having a value which can be varied according to the desired speed of rotation of the motor output shaft, and which receives a control signal corresponding to the signal from the controller and, in response to such signal being received. supplies a corresponding drive signal to the a.c. induction motor. One such drive arrangement is disclosed for use in a sewing machine in U.S. Pat. No. 4,627,370.

The advantage of when using an a.c. induction motor controlled through an inverter is essentially one of cheapness. in particular as compared with, say, a d.c. servomotor, without significant loss of accuracy of control. In many instances, furthermore. the degree of control is acceptable but in general (and indeed in the machine described in the afornentioned U.S. Pat. No. 4,627,370) the control of the speed of operation of the machine is determined by the signal from the controller without any facility for other inputs which may modify the operating speed.

In the machine of the aforementioned patent, the controller is operator actuatable, more particularly treadle controlled, in order to leave the hands of the operator free for manipulating the workpiece. Using such a system, the speed of operation of the machine can be varied over a range of speeds up to a maximum, which normally will correspond with the full depression of the treadle. Where an operator is highly experienced, such a speed control is acceptable. In the case of a less experienced operator, or indeed a learner, however, it is often desirable to restrict the maximum operating speed of the machine to a lower value and indeed such an arrangement has already been proposed in respond of a folding machine. In this machine proposal, however, operation of the threadle is effective to control the speed regardless of the setting of the maximum speed, such that once the set desired maximum has been achieved, further depression of the treadle is ineffective to increase the speed; that is to say, if for example the maximum speed is 50% of the overall maximum, then only 50% of the treadle movement will be effective to vary the speed, so that the greater reduction is in the desired maximum speed, the less the "resolution" on the treadle. This is particularly undesirable in the case of a learner or an inexperienced operator.

OBJECT OF THE INVENTION

One of the various objects of the present invention to greater flexibility in controlling the desired maximum speed of rotation of the output shaft of the motor can be achieved without loss of resolution in terms of the setting of the controller by which the speed can be varied.

It is another of the various objects of the present invention to provide an improved folding machine in which the control of the speed of operation of the main drive shaft, and thus of the operating instrumentalities, is rendered more flexible in order to allow the set desired maximum speed to be varied, e.g., for a learner or less experienced operator without loss of resolution in terms of the movement of the controller by which the speed of rotation of the main drive shaft is varied.

SUMMARY OF THE INVENTION

The invention thus provides, in one of its several aspects, a drive arrangement comprising an a.c. induction motor having a rotary output shaft, and a drive control by which the speed of rotation of the shaft is controlled, and which comprises a signalling arrangement for supplying a digital signal having a value corresponding to the desired speed of rotation of the motor output shaft, the arrangement including a controller for supplying a signal having a value which can be varied according to the desired speed of rotation of the motor output shaft, a processor which receives the digital signal from the signalling arrangement together with at least one other input and which processes the digital signal in accordance which said at least one other output thus to provide a corresponding digital output signal, a digital-to-analogue converter which receives the digital output signal from the processor and converts it to an analogue control signal, an inverter which receives said control signal from the digital-to-analogue converter and, in response to such signal being received. supplies a corresponding drive signal to the a.c. wherein setting means is provided for setting a desired maximum speed of rotation for the motor output shaft, and wherein said at least one other input supplied to the processor is a signal representative of an overall maximum speed of rotation of the motor output shaft, but modified in accordance with a signal supplied from the setting means and corresponding to the set desired maximum speed, and also wherein the maximum speed is achieved only when the value of the variable signal supplied by the controller of the signalling arrangement is at its maximum, and further wherein the value of the output signal supplied by the processor varied with the value of the variable signal supplied by the controller of the signalling arrangement, as modified by at least one other input, proportionately over the whole of the range of such values.

It will thus be appreciated that, using the drive arrangement in accordance with the invention, a drive arrangement comprising an a.c., induction motor and a drive control including an inverter readily lends itself by computer control in particular to control via a processor respectively receiving and supplying digital inputs and outputs. Moreover, by reason of the use of the computer control, processing of the inputs and outputs is more flexible, leading to the facility of varying the relationship between the inputs and outputs such that the resolution on the controller remains unaffected regardless of the relationship between the inputs and outputs. In this way, where the controller comprises an element displaceable e.g. by means of a foot treadle arrangement thus to vary the value of the signal which the controller supplies, full depression of the treadle will correspond with the set desired maximum speed of rotation of the output shaft regardless of its setting, and the intermediate positions of the treadle will correspond with intermediate speeds within the range from zero up to the set desired maximum proportionately.

Conveniently, the controller of the signalling arrangement supplies an analogue signal having a value which can be varied according to the desired speed of rotation of the motor shaft, the signalling arrangement also comprising an analogue to digital converter which receives the analogue signal from the controller, converts it to a digital signal, and supplied such digital signal to the processor. To this end, furthermore, the controller may thus comprise a transducer having a displaceable element and supplying an analogue signal in the form of a voltage, the value of which varies according to the displacement of the element, such displacement being effected e.g. by means of a foot treadle arrangement. In this way, it will be appreciated, a simple operator actuatable control can be provided which nevertheless together with modifying inputs, supplied all of the information necessary of the computer control of the drive arrangement.

In some cases, a so called "open-loop" system is acceptable but where a greater degree of control of the speed of rotation of the output shaft is required, it may be necessary to provide a so called "closed-loop" system. In such a case, the drive arrangement may further comprise an encoder operatively connected the output shaft of the motor, which encoater in turn supplies monitoring signals to the processor, constituting a further input to the processor, and the processor processes such monitoring signals to provide a comparison value representative of the actual rotation speed of the motor output shaft and compares it with a value representative of the desired rotation speed and, in the event of a discrepancy between the two values, modifies its digital output signal to the digital to analogue converter accordingly. Again, by reason of the computer control, it is possible to use the encoater and its monitoring signals to insure an accurate control of the speed of rotation of the output shaft and indeed to insure that it runs at a speed corresponding to the setting of the controller. More particularly, in a preferred embodiment, the processor stores a feedback factor representative of the discrepancy between the two values and thereafter applies such factor modify the signal applied to the digital to analogue converter.

In certain circumstances, it may not be possible for the operator to have access to the controller or indeed it may be otherwise desirable in certain applications to render the controller ineffective for controlling the speed of rotation of the output shaft and to provide an alternative control. In accordance with the present invention, therefore, preferably selecting means is provided for rendering the controller of the signalling arrangement ineffective to supply a variable signal as aforesaid and for supplying, in place of such variable signal, a signal to the processor having a preset value; in a preferred embodiment, furthermore, the preset value of the signal from the signalling arrangement corresponds to the maximum value of the variable signal supplied by the controller. Such an arrangement may be of particular use e.g. in a folding machine, as will be referred to hereinafter.

The invention further provides, in another of its several aspects, a folding machine comprising a main drive shaft, folding instrumentalities arranged at an operating locality of the machine, and a workpiece feeding means driven by an operable in timed relation with the main drive shaft for feeding a workpiece to be folded progressively through the operating locality, wherein for driving the main drive shaft, a drive arrangement is provided comprising an a.c. induction motor having a rotary output shaft, and a drive control by which the speed of rotation of the shaft is controlled and which comprises a signalling arrangement for supplying a digital signal having a value corresponding to the desired speed of rotation of the main drive shaft, said arrangement comprising an operator-actuable treadle-operated controller for supplying an analogue signal having a value which can be varied according to the desired speed of rotation of the main drive shaft, together with an analogue to digital converter which receives the analogue signal from the controller and converts it to a digital signal, a processor which receives the digital signal from the converter of the signalling arrangement together with at least one other input and which processes the digital signal in accordance with said at least one other input thus to provide a corresponding digital output signal, a digital to analogue converter which receives the digital output signal from the processor and converts it to an analogue control signal and an inverter which receives the control signal from the digital analogue converter and in response to such signal being received, supplies a corresponding drive signal to the a.c. induction motor, wherein setting means is provided for setting a desired maximum speed of rotation for the motor output shaft, and wherein said at least one other input supplied to the processor is a signal representative of an overall maximum speed of rotation of the main drive shaft, but modified in accordance with a signal supplied from the setting means and corresponding to the set desired maximum speed, and also wherein the maximum desired speed is achieved only when the value of the variable signal supplied by the controller of the signalling arrangement is at its maximum, and further wherein the value of the output signal supplied by the processor varies with the value of the variable signal supplied by the controller of signalling arrangement, as modified by said at least one other input, proportionately over the whole of the range of such value.

The various advantages of using the particular drive arrangement have already been discussed, but its use is particularly useful in a folding machine wherein a learner or inexperienced operator is using the machine, since a lower maximum speed of operation can be set for the machine while nevertheless retaining the full traverse of the treadle operated controller nd thus its resolution, regardless of the maximum speed as set.

In such a machine, furthermore, a "closed-loop" system may again be provided, and more particularly the machine may further comprise an encoater driven by the main shaft, which encoater in turn supplied monitoring signals to the processor, constituting a further input to the processor and the processor processes such monitoring signals to provide a comparison value representative of the actual rotation speed of the motor output shaft and compares it with a value representative of the desired rotation speed and, in the event of a discrepancy between the two values, modifies its digital output signal to the digital to analogue converter accordingly.

Reference has previously bee made to the need for being able to render the controller ineffective to supply a variable signal and for supplying in its place a signal having a preset value. This facility is especially valuable in a folding machine when it is desired to fold the edge of a relatively large workpiece, thus preventing the operator from gaining close access to the operating locality by reason of the size of the workpiece. Thus, again the machine in accordance with the invention, may further comprises selecting means for rendering the controller of the signalling arrangement ineffective to supply a variable signal as aforesaid and for supplying, in place of such variable signal, a signal to the processor having a preset value, such preset value again conveniently corresponding to the maximum value of the variable signal supplied by the controller. Moreover, as is conventional in many folding machines, detector means may be provided for detecting the presence of a workpiece at the operating locality, the arrangement being such that when the selector means is operative to render the controller ineffective and to supply the signal having a preset value, a signal is supplied by the detector means, in response to its detecting a workpiece at the operating locality, for initiating the operation of the workpiece feeding means of the machine.

The above and other of the various objects and several aspects of the invention will become clearer from the following. drive shaft, while below such maxima the output signal supplied by the processor varies proportionately with the digital signal received by it from the signalling arrangement, as modified by the signal from the setting means, over the whole of the range of values thereof. In this way, it will be appreciated, the degree of control in terms of resolution can be maintained, over the range of value for the signal supplied by the signalling arrangement, regardless of the maximum speed which is set.

In a preferred embodiment of the drive arrangement in accordance with the invention the signalling arrangement comprises a controller which supplies an analogue output signal having a value corresponding to the desired speed of rotation of the motor shaft, and an analogue-to-digital converter which receives said analogue signal from the controller and converts it to a digital signal for supply to the processor as aforesaid. More particularly, in such a case conveniently said controller comprises a transducer having a displaceable element and supplying an output signal in the form of a voltage the value of which varies according to the displacement of said element. In this way, the operator of a machine incorporating such a drive arrangement can, by controlling the position of the displaceable element, e.g. by means of a foot treadle arrangement, closely control the value of the digital signal supplied by the signalling arrangement, and thus the speed of rotation of the drive shaft in a convenient and efficient manner.

The drive arrangement in accordance with the invention is suitable for use in a so-called folding machine in the shoe and allied industries, but would also be useful if other machinery requiring accurate speed control, especially, but not exclusively, where the speed is controlled by the operator him/herself.

There now follows a detailed description, to be read with reference to the accompanying drawings, of a folding machine incorporate the drive arrangement in accordance with the invention. It will of course be appreciated that this machine has been chosen for description merely by way of exemplification of the invention and not by way of limitation thereof.

DESCRIPTION OF THE PREFERRED EMBODIMENT

Figure 1:
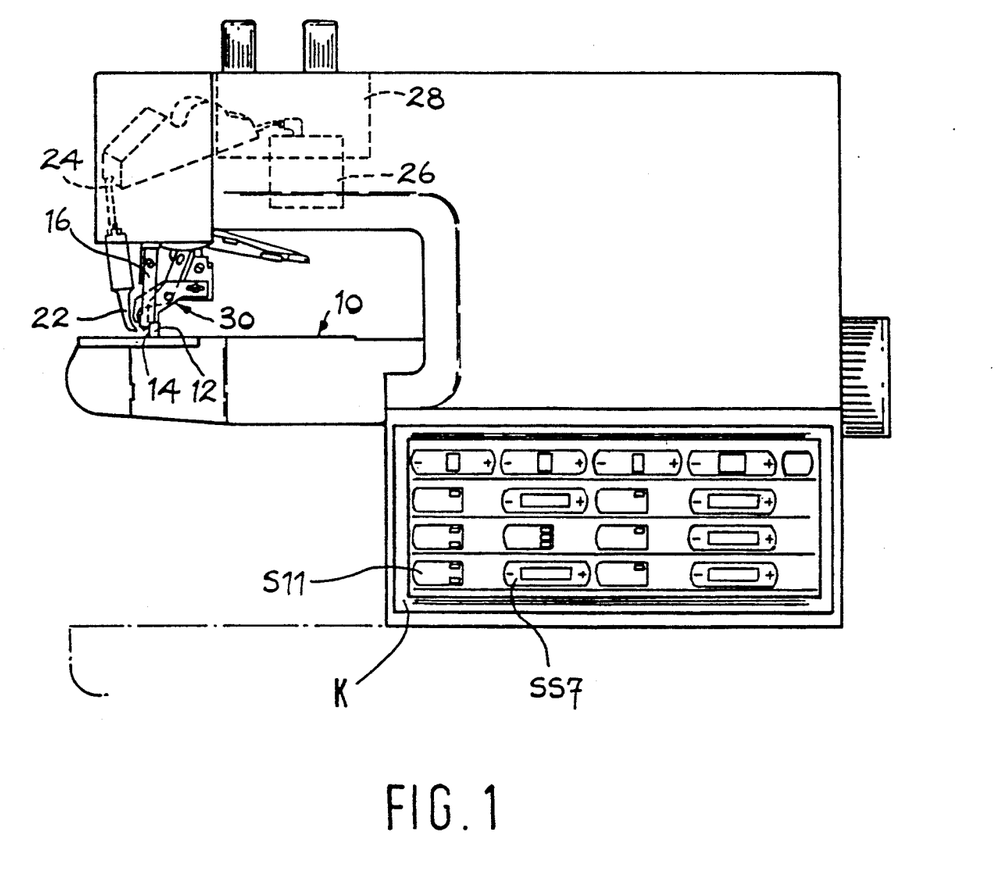
FIG. 1 is a front view of the machine in accordance with the invention, incorporating the drive arrangement in accordance with the invention.

The machine now to be described is a so-called a thermo-cementing and folding machine, which finds use in the shoe industry and allied trades and is generally similar, except as hereinafter described, to the machine described in GB-A 2141968, itself a modification of the machine described in EP-A 0110591. The machine thus comprises a work table 10 on which a workpiece can be supported at an operating locality of the machine, at which conventional folding instrumentalities are located, comprising a fold-initiating block 12 having an upwardly curved work-guiding surface 14, a gauge finger 16, a creaser foot 22 and a lip turner (not shown), which completes the fold of the workpiece edge over the creaser foot. During folding, adhesive can be applied to the workpiece edge through an outlet in the creaser foot, to which adhesive is supplied via a delivery tube 24 from a melt chamber 28 under the action of a gear pump 26, the melt chamber 28, delivery tube 24 and creaser foot 22 being appropriately heated. Other features of the folding instrumentalities are shown in FIG. 1.

"Downstream" of the folding instrumentalities are located conventional edge snipping means generally designated 30, comprising a fixed and a movable blade, and conventional workpiece feeding means in the form of an orbitally moving hammer-and-anvil arrangement (not shown), which also serves to consolidate the fold. A work release clamp (not shown) is also provided for clamping the work against the under-side of the creaser foot during the return movement of the hammer-and-anvil arrangement.

Figure 2:
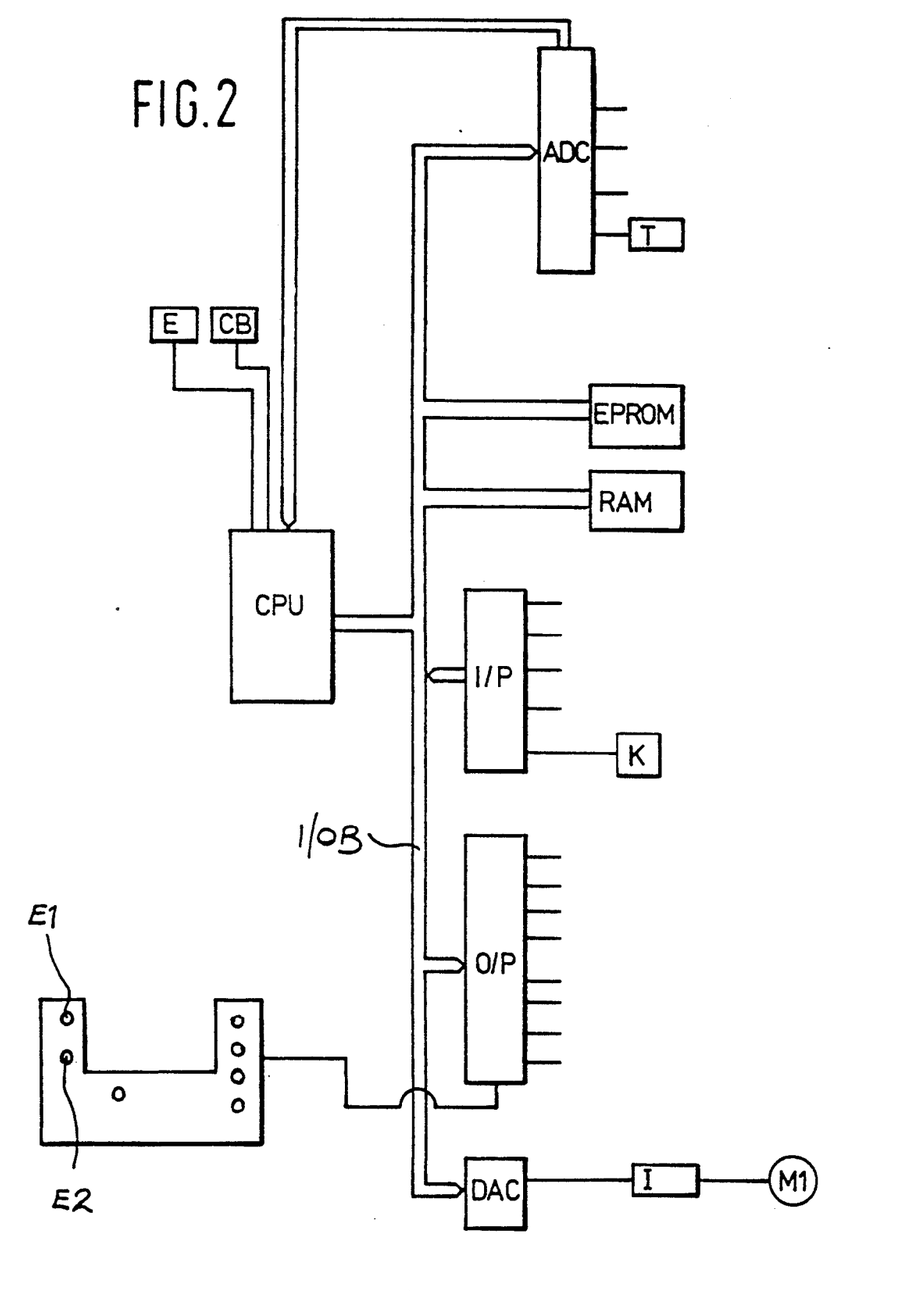
FIG. 2 is a block diagram of control circuitry, including the drive arrangement, of said machine.
Figure 3A:
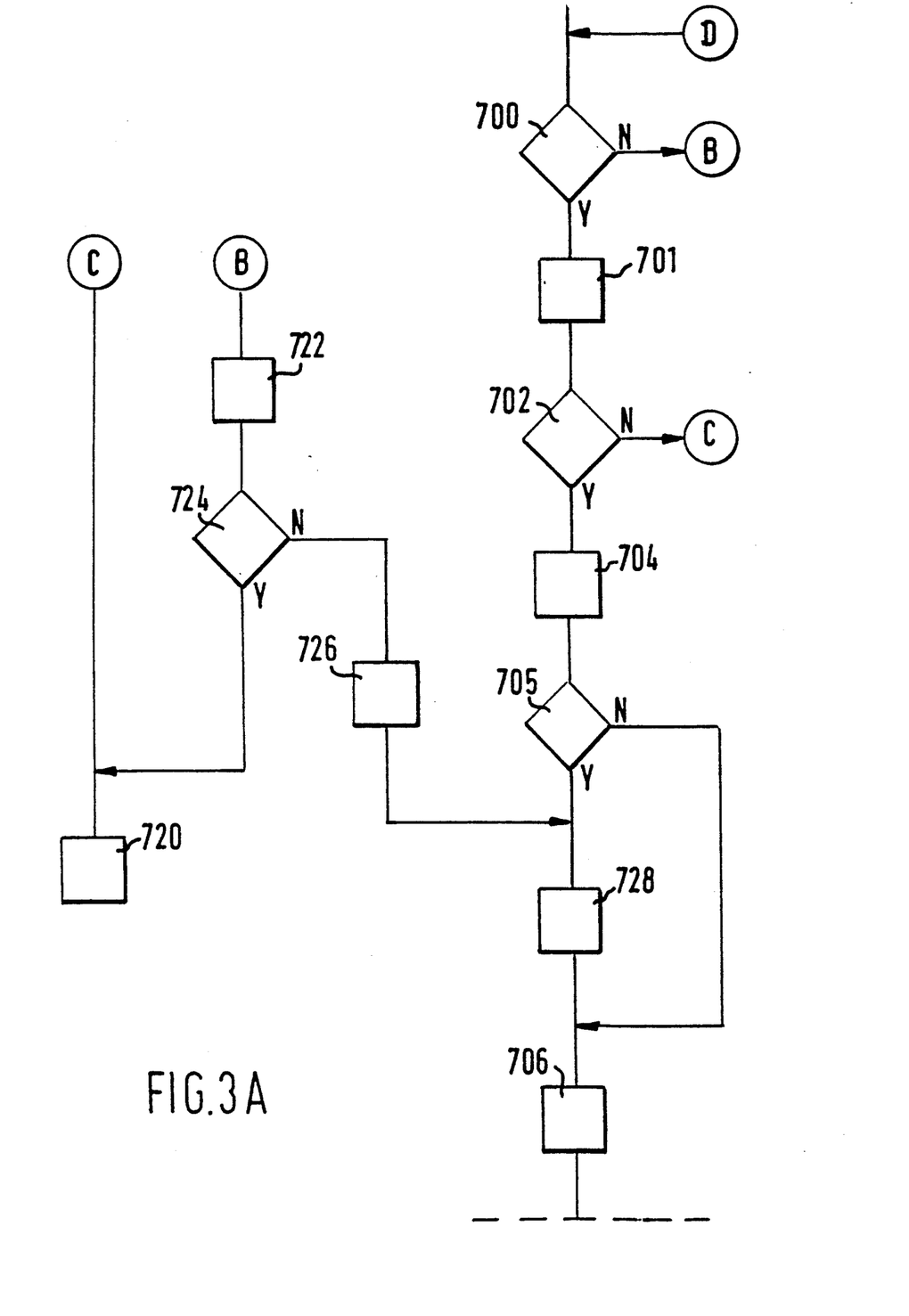
FIGS. 3A and 3B constitute a flowchart indicating the control of the speed of rotation of a main drive shaft of the machine.
Figure 3B:
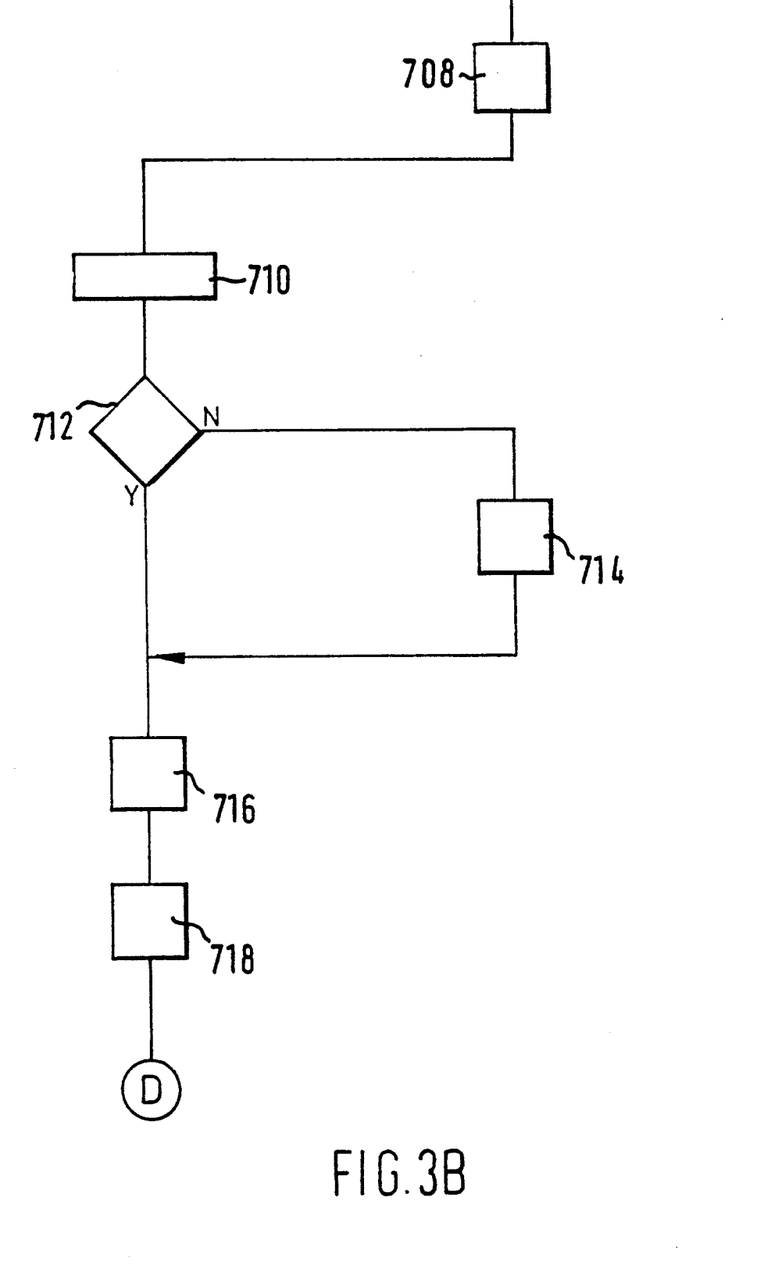

The hammer-and-anvil arrangement is driven through a main drive shaft (not shown) by means of an electric motor M1 operation of which is controlled in turn by computer control means (see FIGS. 2 and 3) through an inverter I. The inverter receives drive signals from the computer control means in the form of a voltage and in response thereto drives the electric motor. The electric motor is in this case an a.c. induction motor. As will be hereinafter described in detail, the motor and more particularly the speed of the motor, and thus the speed of rotation of the main drive shaft (hereinafter referred to as the "feed speed"), may be controlled either automatically or by the operator using a treadle (not shown), which incorporates a variable output signalling device in the form of a transducer T (FIG. 2), forming part of operator-controlled feed speed variation means for varying the speed of rotation of the main drive shaft and thus the speed at which workpieces are fed through the operating locality of the machine.

The machine is also provided with a control panel or keyboard K which includes, inter alia, the following devices for the purposes set out hereinafter:

Switch S11, by which the control of the motor is selectively set for automatic or under operator control, pilot lamps being provided for indicating which selection has been made; and Selector device SS7 by which, as will be described in detail hereinafter, a maximum for the speed of rotation of the main drive shaft "feed speed" can be set.

The machine of which the drive arrangement in accordance with the invention forms part has a 12 volt control circuit supplied with an a.c. supply, from which is an unsmoothed 12 volt a.c. circuit which supplies power to a mains-controlled control box CB supplying a "mains interrupt" signal, to be referred to hereinafter. In addition there is derived from the a.c. circuit a smoothed 12 volt d.c. circuit which supplies power to various integers of the machine not relevant to the present invention, and also from which is derived a 5 volt d.c. circuit which drives a central processor unit CPU and associated circuits and also provides power to the various switch and selector devices of the control circuits of the machine. The central processor unit CPU, which forms part of the computer control means of the machine, is constituted by a single-chip 8-bit microcomputer (in casu, a Zilog Z8681 which, in addition to a microprocessor, also incorporates a random access memory/scratch pad RAM (shown separately in FIG. 2); this microprocessor is obtainable from Zilog Inc). The CPU is connected via input-output bus I/OB with input and output ports I/P, O/P and with a non-volatile memory in the form of an EPROM (erasable programmable read-only memory), which is accessed by the CPU via the I/OB for instructions to execute. In addition, an analogue-to-digital converter ADC is provided, to which signals are supplied by various integers (as shown in FIG. 2) as well as the transducer T, and a digital-to-analogue converter DAC which supplies control (drive) signals for the motor M1. The ADC is interrogated by the CPU, via the I/OBus, each time a mains interrupt signal is supplied to the CPU by control box CB. More particularly the various channels of the ADC are interrogated in turn, one in response to each mains interrupt in a so-called "wrap around" sequence. The ADC supplies information as to the state of the interrogated channel via a direct input to the CPU. The digital-toanalogue converter DAC receives output signals from the central processor unit CPU and, in response to such signals, supplies an analogue signal to the inverter I, constituting a control signal (voltage) for the inverter. The inverter is also supplied with an a.c. mains power supply in the conventional manner. A shaft encoder E driven by the main drive shaft is also provided having a direct "interrupt" input to the CPU. In response to the various signals thus supplied to the CPU, the CPU supplies various outputs via the data bus I/OB to various sub-circuits.

It will thus be appreciated that, for driving the motor M1, firstly a digital signal is supplied to the central processor unit CPU, representing the desired motor shaft speed of rotation. This digital signal may be supplied either, where a "manual" operation is selected by switch S11, from the transducer T via the analogue-to-digital converter ADC (by which the voltage supplied from the transducer is converted to a digital signal), or, where "automatic" operation has been selected, by a direct input into the central processor unit of a digital signal, this being in fact a function of the software itself. Such signal would correspond to the "basic speed" of the motor set at 2,400 rpm, which speed has been assessed as being the optimum for the operation of a machine of this kind. The central processor unit CPU receives the digital input signal together with other inputs, in particular (as will be described in detail hereinafter) a signal from selector device SS7, according to the selected maximum speed of rotation of the drive shaft, and also signals from the incoder E. The digital input signal is processed by the CPU in accordance with these inputs and a digital output signal, corresponding to the input signal as processed, is supplied to the digital-to-analogue converter DAC, by which the digital output signal is converted to an analogue control signal, which is then passed to the inverter I. The motor is thus driven at a speed corresponding to the control signal 30 passed to the inverter. As already mentioned the motor drives the shaft encoder E which in turn supplies to the central processor unit CPU a train of pulses constituting a signal representing the actual speed of rotation of the shaft. This signal can then be compared, as will be described hereinafter, with a corresponding value representing the desired speed of rotation and any necessary adjustment is then made in the processing of the digital input signal to the processor prior to the control signal being supplied to the inverter I; in this way any discrepency between the desired and actual speeds of rotation of the drive shaft is corrected. It will thus be appreciated that in this way, a closed loop system is provided which ensures that the output speed of rotation of the motor corresponds with the desired speed.

Referring now to FIGS. 3A and 3B, at step 700 the status of selecter switch S11 is interrogated. If "automatic" operation is selected then at step 701 flag A is set to signal one and at step 702 a "workpiece present" signal is requested; this may be provided e.g. by detector means E1, E2 arranged at the operating locality of the machine. If a workpiece is present, then at step 704 a signal representing the "basic" speed of the motor (in this case set at 2,400 rpm) is generated. At step 705 the status of flag A is interrogated. If it does not equal zero then at step 706 the status of selector device SS7 is accessed and a reduction factor is determined by which a proportional value of the set "basic" speed can be calculated. According to the selection made, the value of the signal representing the "basic" speed is then reduced by said reduction factor. At step 708 the software then calculates, e.g. by comparing the value thus reduced with look-up tables, the value of the output digital signal to be supplied to the digital-to-analogue converter DAC and thus to the inverter I, whereby to achieve the desired speed of rotation of the motor driveshaft; the output digital signal is supplied accordingly, and in response thereto, a control signal (voltage) is supplied to the inverter by which the speed of rotation of the motor drive shaft is controlled.

At step 710 the actual speed of rotation of the drive shaft, which is monitored by the shaft encoder E, is calculated from a signal, in the form of a train of pulses, supplied by the shaft encoder E to the CPU. At step 712 the signal supplied by the encoder E is compared, using look-up tables (which may be the same tables as previously referred to in), with a value representing the desired speed of rotation of the shaft, with a view to determining whether the difference lies within a pre-set tolerance. If the difference lies outside the given tolerance, then a so-called "feedback factor" is calculated at step 714, which is applicable to the output digital signal supplied by the CPU (as previously calculated at step 708) so as to bring the actual speed of rotation of the shaft to the desired speed. The thus calculated feedback factor is then stored by the CPU for application, without further modification, provided that the difference between the desired and actual speeds of rotation of the drive shaft remains within the tolerance; if no modification of the output signal is required (i.e. when there is no discrepency or the discrepency is within the tolerance), step 714 is of course omitted. The feedback factor is then applied to the output digital signal value at step 716. The appropriate digital output signal is supplied to the digital-to-analogue converter DAC at step 718 and the motor M1 is thus driven accordingly. The circuit then loops back once more to step 700.

If at any stage the "workpiece present" signal at step 702 is discontinued, indicating that a workpiece is no longer present, then at step 720 a signal to stop the operation of motor M1 is supplied.

In the case where at step 700 a "manual" operation has been selected, then at step 722 the value of the digital input signal received by the CPU via the ADC from the transducer T is read and a reduction factor is calculated representing the proportion of the maximum value which the particular read value constitutes. If the value indicates a "stop" condition then at step 724 the flowchart leads to step 720 whereupon a "zero" signal is supplied to the CPU and the motor is (or remains) switched off. Otherwise following step 724, i.e. when "drive" has been selected, flag A is set at zero (step 726), and at step 728 the calculated reduction factor is applied to the value representing the basic speed. At step 706 this reduced value is then further reduced according to the setting of SS7 (as above described) and thereafter subsequent steps are followed as described above.

It will be appreciated that, by applying the reduction factor(s) and the feedback factor to the output digital signal as aforesaid, the range of control (resolution) provided by the transducer is in no way diminished by the reduction of the motor speed: that is to say the motor speed is reduced proportionately to the signal from the transducer according to the applied factors. In this way, the operator control in particular is retained regardless of the maximum speed of operation at which the motor is set. This has been found to be especially useful in a case of an operator who is learning the skill of using the machine in question, since the control remains as sensitive, regardless of the maximum speed of operation.

APPENDIX
Inscriptions for flow chart 'boxes'

| | |
|---|---|
| 700 | Switch 11: is 'automatic' operation of motor M1 selected? |
| 701 | Set Flag A to equal 1 (one) |
| 702 | Are "workpiece present" sensors E1, E2 covered? |
| 704 | Set motor (M1) speed signal to maximum (= 2400 r.p.m.) |
| 705 | Does Flag A = 0? |
| 706 | Device SS7: apply any reduction factor to signal value set at 704 |
| 708 | Calculate value of digital output signal required to drive motor at set speed |
| 710 | Calculate actual speed of rotation of drive shaft from encoder (E) signal and determine feedback factor |
| 712 | Is difference between desired and actual speeds of rotation within pre-set tolerance? |
| 714 | Modify feedback factor |
| 716 | Apply feedback factor to value calculated at 708 (or, if A = 0, as modified at 728) |
| 718 | Supply digital output signal to DAC for driving motor (M1) |
| 720 | Stop motor (M1) |
| 722 | Read transducer (T) signal and calculate reduction factor for application to value set at 704 |
| 724 | Does value of transducer (T) signal indicate "stop" condition of motor (M1)? |
| 726 | Set Flag A to equal zero (0) |
| 728 | Apply reduction factor (of 722) to value calculated at 708. |

We claim:

1. A drive arrangement comprising a motor having a rotary output shaft and a drive control by which the speed of rotation of said shaft is controlled, the drive control comprising:

a processor for receiving input signals, processing them and supplying an output signal in response to which the motor output shaft is caused to rotate at a speed corresponding to the value of the output signal from the processor, setting means for setting a desired maximum speed of rotation of said shaft and for supplying a first input signal to the processor representative of the desired maximum speed of rotation; and signalling means including a controller for supplying a second input signal to the processor representative of the desired speed of rotation of the motor output shaft, the value of said second input signal being variable under operator control according to said desired speed of rotation;

wherein the value of the output signal from the processor is determined by the value of the first input signal but modified according to the value of the second input signal, the desired maximum speed of rotation of the shaft being achieved only when the value of the second input signal is at a maximum, and the value of the output signal varying proportionately with that of the second input signal over the width range of values of said second input signal.

2. A drive arrangement according to claim 1 wherein the controller of the signalling means comprises a transducer having a displaceable element, the value of the second input signal varying with the displacement of said element.

3. A drive arrangement according to claim 2 wherein the displaceable element is displaced by means of a foot treadle arrangement.

4. A drive arrangement according to claim 1 wherein the controller supplies an analogue signal in the form of a voltage the value of which corresponds to the desired speed of rotation on the shaft, the signalling means also comprising an analogue-to-digital converter by which the analogue signal is converted to a digital signal which constitutes the second input signal and is thus supplied to the processor.

5. A drive arrangement according to claim 1 wherein the motor is an a.c. induction motor and the drive control also comprises:

an inverter by which drive signals are supplied to the motor, and a digital-to-analogue converter by which digital output signals supplied by the processor are converted to analogue control signals which are then supplied to the inverter, the value of the analogue control signals and the value of the drive signals corresponding to the value of the output signals, and the drive signals being representative of the desired speed of rotation of the motor output shaft.

6. A drive arrangement according to claim 5 further comprising:

an encoder operatively connected to the output shaft of the motor, which encoder in turn supplies monitoring signals to the processor, constituting a further input to the processor, wherein the processor processes such monitoring signals to provide a comparison value representative of the actual rotation speed of the motor output shaft and compares it with a value representative of the desired rotation speed and, in the event of a discrepancy between the two values, modifies its digital output signal to the digital-to-analogue converter accordingly.

7. A drive arrangement according to claim 6 wherein the processor stores a feedback factor representative of the discrepancy between the two values and thereafter applies such factor to modify the signal applied to the digital-to-analogue converter.

8. A drive arrangement according to claim 7 wherein the encoder comprises a pulse generator which is driven from the output shaft of the motor.

9. A drive arrangement according to claim 1 further comprising:

means for rendering the controller of the signalling means ineffective to supply the second input signal as aforesaid and for supplying to the processor, in place of said second input signal, an input signal having a pre-set value.

10. A drive arrangement according to claim 9 wherein said pre-set value corresponds to the maximum value of the second input signal.

11. A folding machine comprising:

a main rotary drive shaft operatively connected to a rotary output shaft of a motor through a drive control by which the speed of rotation of the rotary output shaft, and thus of the main drive shaft of the machine, is controlled, folding instrumentalities arranged at an operating locality of the machine, and workpiece feeding means driven by and operable in timed relation with the rotation of the main drive shaft of the machine for feeding a workpiece to be folded progressively through the opeating locality, wherein the drive control comprises:

a process for receiving input signals, processing them and supplying an output signal in response to which the motor output shaft is caused to rotate at a speed corresponding to the value of the output signal from the processor, setting means for setting a desired maximum speed of rotation of said shaft and for supplying a first input signal to the processor representative of the desired maximum speed of rotation, and signalling means including a controller for supplying a second input signal to the processor representative of the desired speed of rotation of the motor output shaft, the value of said second input signal being variable under operator control according to said desired speed of rotation, wherein the value of the output signal from the processor is determined by the value of the first input signal but modified according to the value of the second input signal, the desired maximum speed of rotation of the shaft being achieved only when the value of the second input signal is at a maximum, and the value of the output signal varying proportionately with that of the second input signal over the whole range of values of said second input signal.

12. A drive arrangement according to claim 11 wherein the controller of the signalling means comprises a transducer having a displaceable element, the value of the second input signal varying with the displacement of said element.

13. A drive arrangement according to claim 12 wherein the displaceable element is displaced by means of a foot treadle arrangement.

14. A drive arrangement according to claim 11 wherein the controller supplies an analogue signal in the form of a voltage the value of which corresponds to the desired speed of rotation on the shaft, the signalling means also comprising an analogue-to-digital converter by which the analogue signal is converted to a digital signal which constitutes the second input signal and is thus supplied to the processor.

15. A drive arrangement according to claim 11 wherein the motor is an a.c. induction motor and the drive control also comprises:

an inverter by which drive signals are supplied to the motor, and a digital-to-analogue converter by which digital output signals supplied by the processor are converted to analogue control signals which are then supplied to the inverter, the value of the analogue control signals and the value of the drive signals corresponds to the value of the output signals and the drive signals being representative of the desired speed of rotation of the motor output shaft.

16. A drive arrangement according to claim 15 further comprising:

an encoder operatively connected to the output shaft of the motor, whcioh encoder in turn supplies monitoring signals to the processor, constituting a further input to the processor, wherein the processor processes such monitoring signals to provide a comparison value representative of the actual rotation speed of the motor output shaft and compares it with a value representative of the desired rotation speed and, in the event of a discrepancy between the two values, modifies its digital output signal to the digital-to-analogue converter accordingly.

17. A drive arrangement according to claim 16 wherein the processor stores a feedback factor representative of the discrepancy between the two values and thereafter applies such factor to modify the signal applied to the digital-to-analogue converter.

18. A drive arrangement according to claim 17 wherein the encoder comprises a pulse generator which is driven from the main drive shaft of the machine.

19. A drive arrangement according to claim 11 further comprising:

means for rendering the controller of the signalling means ineffective to supply the second input single as aforesaid and for supplying to the processor, in place of said second input signal, an input signal having a pre-set value.

20. A drive arrangement according to claim 19 wherein said pre-set value correspondings to the maximum value of the second input signal.

21. A machine according to claim 19 further comprising detector means for detecting the presence of a workpiece at the operating locality and, in response to such detection, supplying a signal for initiating operation of the workpiece feeding means when the selector means is operative to render the controller ineffective and to supply said signal having a pre-set value.

* * * * *